Sept. 2, 1941.   C. DORNIER   2,254,355
AQUATIC AIRCRAFT
Filed Nov. 4, 1938
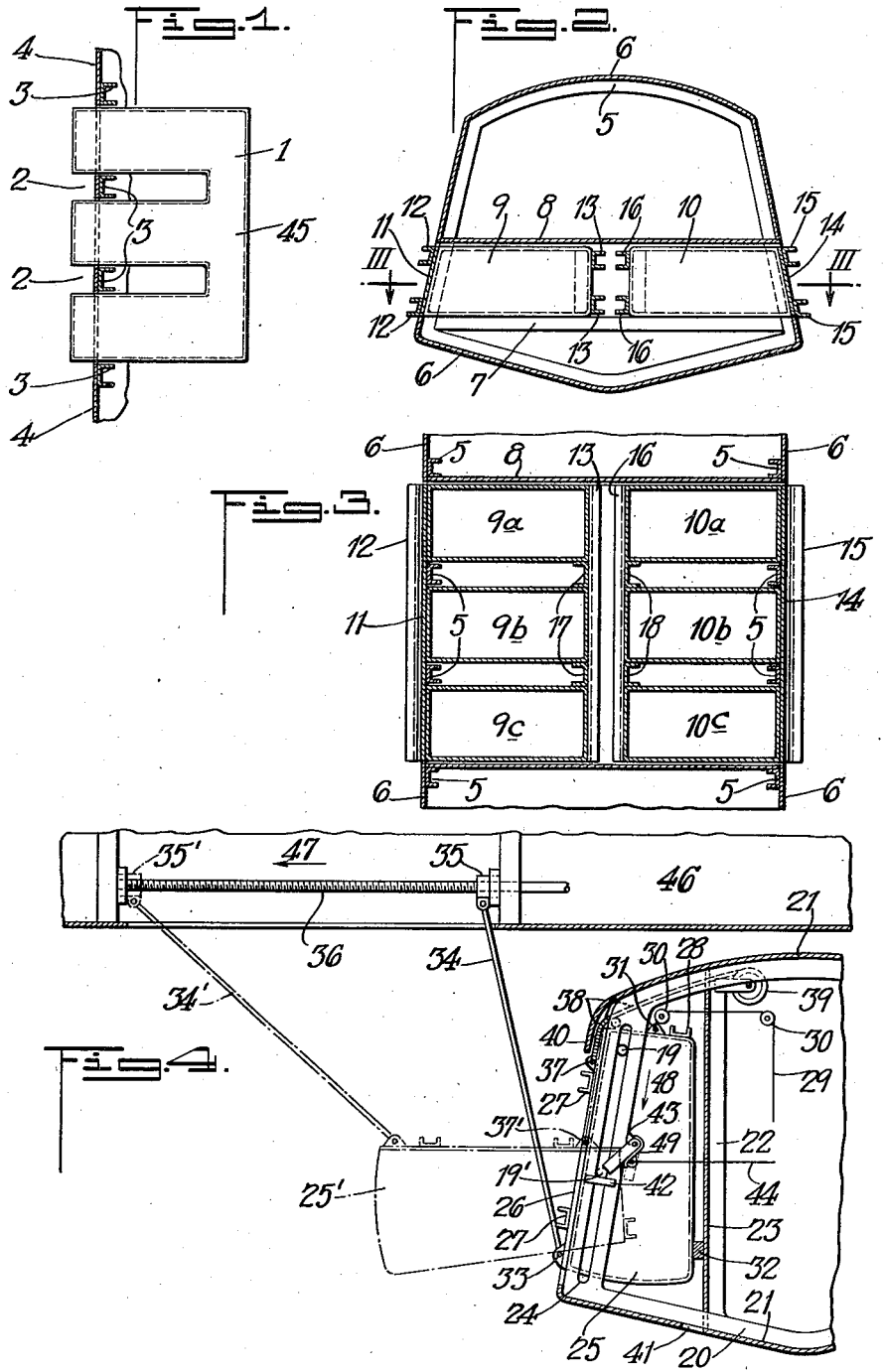
INVENTOR
CLAUDE DORNIER.
BY
ATTORNEY Patented Sept. 2, 1941

2,254,355

UNITED STATES PATENT OFFICE 2,254,355

AQUATIC AIRCRAFT

Claude Dornier, Friedrichshafen-on-the-Bodensee, Germany, assignor of one-half to Dornier-Werke G. m. b. H., Friedrichshafen-on-the-Bodensee, Germany Application November 4, 1938, Serial No. 238,750
In Germany November 24, 1937

11 Claims. (Cl. 244—105)

The present invention relates to a novel construction of flying boats or other seagoing or amphibian aircraft, more particularly to the design and construction of retractable outriggers, laterally protruding floats or stumps and the like.

It is an object of the present invention to provide an aircraft of the seagoing or amphibian type a retractable float which laterally protrudes from the fuselage or main body of the aircraft when in protracted position and which is of considerable size and does not impair the strength of the said main body and does not interfere with the provision of frames or necessitate an interruption or extraordinary construction of the frames or other longitudinal and/or transverse elements of the framing.

An object of the present invention resides in the provision of retractable floats in aircraft constructed to arise from and land on water in combination with the framing of the main body of said aircraft whereby the frames adjacent to said floats are of same general configuration as the other frames.

According to the present invention the floats are provided with slots at the points where frames are provided and which slots provide space for said frames. The floats, according to the present invention, have a plurality of individual parts in between which the frames are located. The individual parts of the floats are either interconnected to form a constructional unit at the ends which remain within the main body of the aircraft when the floats are protracted or the floats or fins are divided in and composed of separate individual members which are interconnected at their ends to form a rigid unit. Some of the connections may be disposed outside of the frames of the main aircraft body.

A further object of the present invention resides in the provision of blinds which cover the openings in the hull of the aircraft when the floats or fins are protracted and which are closed by said floats or fins when they are retracted, and also in a combination of such blinds with said floats.

Further and other objects of the present invention will be hereinafter set forth in the accompanying specification and shown in the drawing which, by way of illustration, shows what I now consider to be a preferred embodiment of my invention.

In the drawing:

Figure 1 is a part sectional diagrammatical top view of a retractable float and adjacent part of the hull of the flying body.

Figure 2 is a cross sectional view of the part of the main body of an aircraft according to the present invention which is adjacent to the retractable floats.

Figure 3 is a cross sectional top view of the construction shown in Figure 2 and taken along line III—III of Figure 2.

Figure 4 is a cross sectional view of a modified aircraft body and protractable float construction according to the present invention.

Like parts are designated by like numerals in all figures of the drawing.

Referring more particularly to the drawing, Fig. 1 illustrates in general the idea underlying the present invention. 1 designates a protractable fin or float as seen from the top and which is provided with transverse slots or recesses 2 and has an interconnecting longitudinal portion 45. The top view of a float according to the present invention has therefore the general appearance of a comb or fork. 3 designates frames of the floating body of the aircraft and 4 the outer skin or hull of said body.

Figure 2 is a transverse sectional view of the floating body of an aircraft adapted to land on and take off from water and which is equipped with slidable floats which can be laterally protruded from said body to increase its stability on the water surface in case of need. Figure 3 is a cross sectional view taken along line III—III in Fig. 2 and looking in the direction of the arrows. The aircraft body comprises frames 5, a hull or skin 6, transverse structural members 7 and a watertight casing 8 around the chamber containing the floats or fins 9 and 10 when retracted; the floats 9 and 10 are adapted to be moved on said members 7; each float comprises three box-like parts 9a, 9b, 9c and 10a, 10b, 10c respectively which are individually disposed so that they can be slid outward and inward in between the frames 5. The boxes forming float or fin 9 are interconnected outside of frames 5 by means of bridging elements 12 and skin 11. When the float is retracted, skin 11 is flush with skin 6. In the interior of the aircraft body box parts 9a, 9b and 9c are interconnected by means of profile members 13. Likewise box parts 10a, 10b and 10c which, together, form the float 10 are interconnected outside of frames 5 by means of profile members 15 and exterior skin 14, and inside of frames 5 by means of profile members 16. Vertically positioned connecting members 17 may be provided for interconnecting the individual parts 9a, 9b and 9c and the members 13. Similarly, vertical members 18 may be provided to interconnect parts 10a, 10b, 10c and the members 16.

In Figure 4 an embodiment of the present invention is shown in which the floats 25 are swung out of the aircraft body and propped against another part of the aircraft, for example an aircraft wing. The aircraft body comprises the frames 20 and the hull or exterior skin 21. Vertical constructional members 22 are connected with those of frames 20 which are adjacent to the swingable floats 25. A watertight partition 23 is provided which separates the interior of the aircraft body from the chambers which receive the floats when they are not swung out. Frames 20 are provided with guide slots 24 which are substantially parallel or equidistant to the hull of the aircraft body. Float 25 consists of a plurality of individual floating bodies as do the floats 9 and 10 of the construction shown in Figures 2 and 3. Outside of the frames 20 the individual floating bodies are interconnected by members 27 and a skin 26 which is flush with the hull 21 when the float is retracted. Inside the frames 20 the individual floating bodies are interconnected by means of members 28. The floats are provided with pins 19 which are adapted to slide in the slots 24. When retracted the floats rest on members 32; they are held or suspended in retracted position by means of ropes or chains 29 which are connected to the floats 25 at points 31 and run over guide rollers 30 which are connected to the aircraft body. The outer part of the float is provided with ear members 33 to which struts 34 are movably connected. The other end of struts 34 is movably connected to a nut member 35 which cooperates with threaded spindle 36 which is rotatably supported by and connected to a part of the aircraft, for example the wing 46.

Furthermore, according to the present invention, a blind 38 is provided, one end of which is connected to float 25 at point 37, the other end is connected to roller 39 on which the blind can be rolled up. The upper part of the hull 21 is of such configuration as to cover the upper part of the retracted float 25; this covering part of hull 21 is designated by numeral 40.

41 designates an opening in the cover part of hull 21 which participates in the formation of the chamber for receiving the retracted float; after the take off of the aircraft from the water surface, the water accumulated in the float chamber runs out through opening 41.

The operation of the device shown in Fig. 4 is as follows:

If spindle 36 is revolved in such direction that the nut member moves in the direction of the arrow 47 until it reaches the position 35' shown in dash and dotted lines, the lower part of the float or fin 25 is pulled out of the aircraft body by means of the strut 34. Pins 19 move thereby downward in slot 24 in the direction of arrow 48. This movement lasts until pins 19 rest on abutment 42. Fin 25 is then in the position shown in dash and dotted lines and designated by numeral 25'. Pin 19 is held in position 19' by means of the latch member 43 which is swingably connected with frame 20 and forced into the position shown in Fig. 4 by means of a spring 49. Fin or float 25' is prevented from moving upward within the aircraft body by latch 43 and is also propped against the aircraft part 46 by means of strut 34 which is now in the position designated by numeral 34'. When the float 25 is swung out, the ear 37 moves downward into position 37' and pulls with it the blind 38 unrolling it from reel 39. The opening between the frames is thereby always covered by the blind 38.

For swinging the float into the aircraft body latch 43 is pulled inward against the tension of spring member 49 by means of the pulling member 44, then the float 25 is pulled upward by pulling on rope or chain 29 and the movement of the float controlled by revolving spindle 36 and moving nut member 35 to the right.

While I believe the above described embodiments of my invention to be preferred embodiments, I wish it to be understood that I do not desire to be limited to the exact details of design and construction shown and described, for obvious modifications will occur to a person skilled in the art.

What I claim as my invention is:

1. An aircraft for taking off and landing on water having a body adapted to float on the water, said body having a plurality of frame members, a retractable float connected with said body for increasing stability of said aircraft on the water, said float having a longitudinal portion extending over a plurality of said frame members and having spaced transverse portions extending from said longitudinal portion and between said frame members when said float is in protracted position.

2. An aircraft for taking off and landing on water having a body adapted to float on the water, said body having a plurality of frame members, a retractable float connected with said body for increasing stability of said aircraft on the water, said float having longitudinal portions extending over a plurality of said frame members and having spaced transverse portions connected to said longitudinal portions and forming slots for accommodating said frame members.

3. An aircraft for taking off and landing on water having a body adapted to float on the water, said body having a plurality of frame members, a retractable float connected with said body for increasing stability of said aircraft on the water, said float extending over a plurality of said frame members and having recesses to accommodate said frame members, and a bridging member connected to said float outside of said frame members for bridging said recesses.

4. An aircraft for taking off and landing on water having a fuselage and a framework therein, floats fully retractable into and being protractable from said fuselage for increasing stability of said aircraft on the water, said floats consisting of a plurality of individual floating bodies spaced apart to accommodate said framework between said bodies and a plurality of structural members interconnecting said individual bodies to form rigid floats.

5. An aircraft for taking off and landing on water having a body adapted to float on the water, said body having a plurality of frame members, a retractable float connected with said body for increasing stability of said aircraft on the water, said float comprising a plurality of individual floating bodies disposed between said frames, and connecting members rigidly interconnecting said bodies and disposed inside of said frame members.

6. An aircraft for taking off and landing on water having a body adapted to float on the water, said body having a plurality of frame members, a retractable float connected with said body for increasing stability of said aircraft on the water, said float consisting of a plurality of individual floating bodies which are disposed between said frames, connecting members rigidly interconnecting said bodies and being disposed inside and outside of said frame members.

7. An aircraft for taking off and landing on water having a body adapted to float on the water, said body having a plurality of frame members, a retractable float connected with said body for increasing stability of said aircraft on the water, said float having a longitudinal portion extending over a plurality of said frame members and having spaced transverse portions extending from said longitudinal portion between said frame members when said float is in protracted position, said body having a hull and said transverse portions having an end surface flush with said hull when said float is in retracted position.

8. An aircraft for taking off and landing on water having, in combination, a body adapted to float on the water and comprising a plurality of frame members, a water tight compartment within said body and having said frame members extending therethrough, a support member within said compartment, a float member movably resting on said support member and being within said compartment when in retracted position and being adapted to be moved on said support member outside of said chamber to protrude from said body for increasing stability of said aircraft on the water, said float member comprising a plurality of rigidly interconnected floating bodies positioned between said frame members.

9. An aircraft for taking off and landing on water having, in combination, a body adapted to float on the water and having a hull, an opening in said hull, a water tight compartment within said body and communicating through said opening with the outside of said body, a retractable float located within said compartment when in retracted position and protruding through part of said opening from said body when in protracted position for increasing stability of said aircraft on the water, a blind connected with said body adjacent to said opening and with said float and being moved together with said float and instantaneously fully closing the part of said opening which is not closed by said float when it is moved from its fully retracted position.

10. An aircraft for taking off and landing on water having, in combination, a body adapted to float on the water and having a hull with an opening therein, a retractable float swingably and slidably supported in said compartment and being adapted to be swung and slid out of said compartment through said opening for increasing stability of said aircraft on the water, said float taking up only part of said opening when in swung and slid out position, a blind connected with said body adjacent to said opening and with said float and being simultaneously moved therewith and closing that part of said opening which is left open when said float is in swung and slid out position.

11. An aircraft for taking off and landing on water having, in combination, a body adapted to float on the water and comprising a plurality of frame members, a water tight compartment within said body, having said frame members extending therethrough, a retractable float swingably supported in said compartment and being adapted to be swung out of said compartment for increasing stability of said aircraft on the water, said float comprising a plurality of rigidly interconnected individual floating bodies positioned in between said frame members.

CLAUDE DORNIER.